United States Patent Office 2,784,135
Patented Mar. 5, 1957

2,784,135

PROCESS FOR THE MANUFACTURE OF POLY-ACRYLONITRILE FILMS AND LAMINATES

William M. Wooding, Springdale, and Norman T. Woodberry, Stamford, Conn., assignors to American Cyanamid Company, New York, N. Y., a corporation of Maine No Drawing. Application April 30, 1954,
Serial No. 426,914

10 Claims. (Cl. 154—139)

The present invention relates to sheet material having a continuous phase of fused polynitrile fibers, and processes for the manufacture thereof. The invention includes clear, mottled, or opaque films of fused polynitrile fibers containing, if desired, non-thermoplastic fibers, as well as laminates prepared therefrom. The invention particularly relates to the manufacture of such products by a process wherein a water-laid web containing polynitrile filaments is hot-pressed to form a sheet having a continuous polynitrile phase.

Our co-pending application Serial No. 380,776 filed on September 17, 1953, discloses and claims a process for manufacturing water-laid webs, including paper, by beating wet-spun polynitrile filaments in aqueous suspension until the polynitrile fibers have fibrillated, sheeting the fibers, and heating the resulting web to dry the same and develop a bond between the fibers.

We have now discovered quite unexpectedly that odorless, strong, flexible, water-clear, transparent films can readily be prepared by hot-pressing at moderate temperatures and pressures water-laid webs thus produced. The films thus obtained are extremely resistant to water and thus represent a substantial improvement over non-fibrous regenerated cellulosic film which generally requires plasticization, treatment with an anchor coating, and application of a topcoat before becoming suitable for use as a moisture-resistant protective wrap.

The further discoveries have been made that films of the type described, but having an attractive mottled appearance can equally readily be prepared by curtailing the duration of the hot-pressing step so that only a part of the polynitrile fibers fuse, and that opaque films can be prepared by hot-pressing a water-laid web containing, in addition to the polynitrile filaments, from a minor to a major proportion of cellulose or other non-thermoplastic fibers.

We have additionally discovered that sheet material may be prepared by laminating assemblies composed of webs of the type described. The assemblies may contain one or more sheets of infusible fabric such as paper or cotton, cloth or wire, sandwiched between sheets of the polynitrile felt.

We have further found that films of improved strength are obtained when the polynitrile filaments are textile filaments, that is, when the filaments are stretched in the course of their manufacture to effect molecular orientation as is known in the art, and particularly when the filaments are stretched at least until the filaments, when subjected to X-rays in an X-ray diffraction apparatus, exhibit a noticeable X-ray diffraction pattern. The evidence at hand, surprisingly, indicates that this molecular orientation is in large part retained when the fibers are hot-pressed, and that the strength of the films in large part is attributable to this residual orientation.

The employment of water-laid webs according to the present invention possesses the following particular advantages.

1. Water-laid polynitrile webs are necessarily completely uniform in composition and structure. As a result, films prepared therefrom are similarly uniform.

2. The filaments in the web are essentially randomly arranged, and therefore films prepared therefrom do not possess an axis of weakness.

3. The webs are dimensionally stable and can be readily cut or punched into any desired shape, thereby facilitating the fabrication of laminates of irregular shape.

The clear films of the present invention find use as wrapping material and as condenser dielectrics. The mottled films and the opaque films containing other fibers are also useful for these purposes as well as decorative coverings. The laminates containing paper, cloth, wire screening, or other infusible material, find use among other things as countertops and gear blanks.

Films produced by hot-pressing of webs consisting of fibrillated, wet-spun, oriented polynitrile fibers, possess the following characteristics.

1. They are substantially water-clear in color and are completely transparent.

2. They are very flexible and do not require the addition of plasticizer.

3. They have high tensile strength.

4. They are unaffected by immersion in hot water for prolonged periods of time and by contact with the principal organic solvents. They have low permeability to water.

5. They are soluble in dimethyl formamide and aqueous sodium thiocyanate.

6. They have excellent resistance to discoloration and embrittlement under ultra-violet light.

7. They act as good electrical insulation.

8. They are thermoplastic and the edges can be readily heat-sealed together.

The polynitrile filaments referred to above are essentially linear polymers formed by homopolymerization of acrylonitrile or are copolymers formed by copolymerizing a major amount of acrylonitrile or a similar $\alpha,\beta$-unsaturated nitrile with a minor amount, up to about 15% by weight thereof, of a suitable modifying agent copolymerizable therewith, such as an $\alpha,\beta$-unsaturated amide or ester. The polymer or copolymer is then dissolved in a suitable solvent such as an aqueous sodium thiocyanate and the resulting gel is extruded into water where it becomes a thread. Thereafter the filaments are advantageously stretched for the purpose of imparting molecular orientation and thereby increasing their strength preferably until the fibers, when subjected to X-ray in an X-ray diffraction apparatus, display a regular X-ray diffraction pattern. The pattern thus developed, while discernable, is normally indistinct. Chemically, the fibers may be regarded as essentially polyalkanes 50% of the atoms of which carry nitrile radicals or a mixture of nitrile radicals and the modifying radicals referred to above. The fibers are more fully described in U. S. Patent Nos. 2,558,735, 2,595,847, 2,613,195, 2,611,929, and 2,644,803 and have softening points in the range of roughly 400°–600° F.

The term "wet-spun" is employed to distinguish the filaments thus produced from those produced by other methods such as the "hot melt" method wherein molten polymer is extruded through spinnerettes into cooler air, and the "air-dry" method wherein the polymer is dissolved in a volatile solvent and the solution is extruded through spinnerettes into air, a filament developing upon volatilization of the solvent.

According to one embodiment of the present invention, wet-spun stretched polynitrile filaments are chopped into convenient lengths, normally between ½" and 1½", and are beaten in the same manner as cellulose fibers are treated to fibrillate and hydrate the same in preparation for their formation into paper. The beating may be prolonged until the filaments, when examined under a microscope, display a high degree of splitting and the development of tendrils of the order of magnitude shown in our co-pending application as yielding a paper of maximum dry strength. The process of the present invention, however, does not require any such extensive beating and it is sufficient if the fibers are beaten and fibrillated only to a sufficient extent as to form a web which is sufficiently strong and of sufficiently good formation to be rolled, cut, laid in place and otherwise handled. For this purpose, beating for about 15 minutes is usually sufficient.

The resulting suspension is sheeted in the same manner as cellulose fibers and the resulting web is dried, additional strength being imparted when the drying temperature is in excess of 150° F.

The resulting paper is then hot-pressed until a substantially continuous phase forms from the fused polynitrile fibers, some of the fibers, however, remaining unfused. The product is a film or sheet of clear plastic material carrying unfused polynitrile fibers therein, which may form an attractive pattern depending on the amount of the fibers which have been fused. The hot-pressing may be continued until all the filaments have fused, in which case the product is a clear substantially colorless highly flexible film.

For numerous applications as in the production of countertop material, the paper may contain as little as about 10% by weight of cellulose or other infusible fibers, dense, glossy opaque and hard films or sheets being obtained when the weight of the infusible fibers is about 30%–90% of the weight of the web. These composite papers are most conveniently prepared by forming an aqueous suspension from the cellulose or other fibers and from the polynitrile fibers and mixing the suspensions in the desired proportion.

The method of hot-pressing referred to is essentially conventional and is therefore not a feature of the present invention.

The temperatures, pressures and time employed are interdependent variables, and therefore the optimum conditions are most conveniently found by routine laboratory trial. As a guide, however, we have found that suitable pressing temperatures are about 150°–200° F. lower than the fusion point of the filament as determined by the "sticking" method, that is, the temperature to which a steel plate must be heated to cause a filament to adhere when drawn across the surface thereof. When a pressure of 1500–3000 lbs. per square inch is used in a press heated to about 200° F. less than the sticking point of the filaments, the pressing of one or two thin sheets of a pure polynitrile web for 3–5 minutes yields a mottled film of attractive appearance while somewhat longer (10–20 minutes) gives a completely clear film. The use of higher pressures permits the film to form in a correspondingly shorter time at the same temperature. Higher temperatures may also be employed but because of the tendency of the fibers to brown on heating, minimum effective fusion temperatures are preferred with correspondingly high pressures. In the case of thicker sections where heat transfer is more difficult, correspondingly longer pressing times are preferred rather than the use of elevated temperatures. Although it has not been tried, there is no reason to doubt that conversion of a single sheet of web into film can be effected on a continuous scale by passing the web between heated rolls having a heavy nip, and such procedure is therefore included within the scope of the present invention.

In the process described, the pressing should be continued at least until a continuous polynitrile phase forms which bonds the remaining materials together forming a strong, pliable film. In the case of pure polynitrile paper, pressing may be advantageously terminated when about 90–98% or more of the fibers have fused. The product is then a clear film regularly mottled with the residual fibers giving the film an attractive ornamental appearance.

The raw material for the process may consist of freshly manufactured polynitrile textile filaments. The process, however, is particularly valuable in that it permits direct use of off-grade or off-color spun polynitrile thread or textiles woven therefrom which may be dyed. The textile material is advantageously first chopped and shredded, after which it is beaten as described.

Although it has not been tried, no reason is seen why the process of the present invention cannot be applied to providing wood and regenerated cellulose film with a fused polynitrile filament coating.

The invention is further described by the examples which follow. These examples illustrate specific embodiments of the invention and are not to be construed as limitations thereon.

Example 1

Wet-spun, 3-denier polyacrylonitrile textile filaments having a flow point of about 539° F. as determined by the sticking method were hand-chopped to about 1¼" lengths, slurried with water to a consistency of 1%, and beaten for two hours in a one-pound Valley laboratory beater with ten pounds on the bedplate arm. At this point the fibers were extensively fibrillated, and under a microscope resembled beaten cellulose fibers. The fibers were then sheeted in a Nash laboratory handsheet machine to form 4.8 gram sheets 10" x 12" in size (equivalent to a basis weight of about 45 lbs. per 25 x 40/500 ream), and the sheets dried at 240° F. for one minute. The sheets were very well formed and were practically indistinguishable in appearance and feel from ordinary book paper.

A web having more the appearance of a compressed bat was obtained when the time of beating was shortened to 15 minutes.

Example 2

A single sheet of polynitrile paper prepared by beating polynitrile fibers for two hours according to Example 1 was placed in a hydraulic press heated at 355° F., pressed for three minutes at 1500 lb./in.$^2$ pressure, and cooled in the press. Before use, the mold had been dusted with zinc stearate as lubricant and then wiped apparently clean. A mottled film was obtained which consisted of a continuous phase of water-clear transparent fused polyacrylonitrile through which were regularly dispersed areas of unfused fibers which occurred about every ⅜", so that the film resembled ordinary non-fibrous regenerated cellulose film carrying snowflakes. The film was flexible, strong and odorless and unaffected by two hours of immersion in water at 190° F. The film was suitable for use as an ornamental wrapping material.

From inspection of the film, it was evident that a satisfactory, partially transparent wrapping material of attractive mottled appearance results when between about 20% and 90% of the polynitrile fibers have fused.

The film was slowly torn along its length so as to cause the tear line to pass through numerous completely transparent areas. It was noted that the tear boundaries in these areas were not sharp, and under a microscope these boundaries were seen to be composed of fibrous matter. From this it was inferred that these apparently clean areas were composed of latent fibrous structure.

A similar film was obtained using the web of Example 1 produced from filaments which had been beaten for only 15 minutes.

Example 3

The procedure of the first paragraph of Example 2 was repeated except that the pressure was increased to 3000 lb./in.² and the time to 10 minutes. A clear film resulted resembling regenerated cellulose film.

opaque and were formed by pressing assemblies of paper corresponding to the product of Example 4.

| No. | Composition, Percent | | Molding | | Thickness (Mils) | Freq., C./S. | Dielectric Constant | | Dissipation Factor | |
|---|---|---|---|---|---|---|---|---|---|---|
| | Polyacrylonitrile | Kraft | Temp., °F. | Pressure, Lb./in.² | | | As Rec'd¹ | Dried² | As Rec'd¹ | Dried² |
| A | 100 | Nil | 410 | 5,080 | 66 | 10² / 10⁶ | 4.31 / 3.97 | 4.26 / 3.93 | 0.061 / 0.047 | 0.059 / 0.046 |
| B | 50 | 50 | 355 | 1,500 | 59 | 10² / 10⁶ | 5.43 / 5.02 | 5.26 / 4.92 | 0.074 / 0.045 | 0.055 / 0.041 |
| C | 50 | 50 | 410 | 2,540 | 54 | 10² / 10⁶ | 4.24 / 3.90 | 4.17 / 3.85 | 0.060 / 0.047 | 0.060 / 0.047 |

¹ After aging 48 hours at 73° F. and 50% relative humidity.
² After drying for two weeks over calcium chloride.

The film was immersed in water at 190° F. for two hours without noticeable effect. The film was spot-tested with benzene, acetone, gasoline, ethanol, ethyl acetate, chloroform, carbon tetrachloride, and diethyl ether without softening or other noticeable effect.

A film corresponding to the foregoing was cut in half. The cut edges were overlapped ¼" and the point of a hot soldering iron was touched thereto at several spots. The edges were thereby "spot welded" together.

*Example 4*

The procedure of the first paragraph of Example 1 was repeated except that half of the beaten suspension was drained off and replaced with a 1% suspension of beaten bleached kraft (sulfate) paper-making fibers, the suspensions blended in the beater, and the sheets dried at 240° F. for two minutes.

The product was paper composed of 50% by weight of fibrillated polynitrile fibers and 50% by weight of bleached kraft fibers.

*Example 5*

A sheet of the paper of Example 4 was pressed according to Example 2. The product contained a continuous polynitrile phase and resembled very glossy paper containing minute translucent areas.

*Example 6*

An assembly formed by stacking eight sheets of the all-polynitrile fiber paper of the first paragraph of Example 1 was pressed at 410° F. and 1500 lb./in.² for 20 minutes and cooled in the press. The product was a stiff, opaque, glossy laminate having light brown mottling.

*Example 7*

The procedure of Example 6 was repeated using, however, the polynitrile fiber-kraft fiber paper of Example 4. The product was an opaque laminate having a glossy surface and a brown mottled, opaque appearance.

*Example 8*

An assembly was formed by placing a square of light cotton shirting cloth between two pieces of polynitrile paper corresponding to that of the first paragraph of Example 1. The assembly was pressed for ten minutes at 3500 lb./in.² pressure and 350° F. The product was a hard, glossy flexible laminate of cotton cloth in fused polynitrile.

Effective lamination takes place when the polynitrile paper contains a minor amount, up to about 50% by weight, of infusible fibrous material.

*Example 9*

The electrical properties of sheet material containing fused polynitrile fibers was determined with the following results. Sample A was a clear laminate formed by hot-pressing an assembly of pure polyacrylonitrile paper sheets corresponding to the sheet formed according to the first paragraph of Example 1. Samples B and C were opaque and were formed by pressing assemblies of paper corresponding to the product of Example 4.

These results show that for ordinary applications, the materials tested are useful insulators.

We claim:
1. A process for the manufacture of sheet material which comprises hot-pressing a water-laid web containing at least about 10% by weight of wet-spun filaments of an acrylonitrile polymer in fibrillated form, said polymer containing a major proportion of acrylonitrile and thereby fusing sufficient of said filaments to form a sheet having a continuous phase.
2. A process according to claim 1 wherein the acrylonitrile polymer filaments are stretched filaments which yield a diffraction pattern when subjected to X-rays in an X-ray diffraction apparatus.
3. A process according to claim 1 wherein the web contains 30% to 90% by weight of said wet-spun acrylonitrile polymer filaments.
4. A process for the manufacture of partially transparent film which comprises hot-pressing a water-laid web of fibrillated wet-spun stretched filaments of an acrylonitrile polymer in fibrillated form, said polymer containing a major proportion of acrylonitrile until between about 20% and 90% of said filaments have fused and a continuous phase of said polymer thereby results.
5. A process for the manufacture of transparent film which comprises hot-pressing a water-laid web of wet-spun stretched filaments of an acrylonitrile polymer in fibrillated form, said polymer containing a major proportion of acrylonitrile until all of said filaments have fused.
6. A process according to claim 5 wherein the filaments of said acrylonitrile polymer in the web display a diffraction pattern when subjected to X-rays in an X-ray diffraction pattern apparatus.
7. A process for the manufacture of a laminated sheet which comprises placing an infusible fabric next to at least one sheet of a water-laid web containing at least about 50% by weight of wet-spun stretched filaments of an acrylonitrile polymer in fibrillated form, said polymer containing a major proportion of acrylonitrile the weight of said sheet being about ⅛ of the weight of said fabric, and hot-pressing the assembly thus formed to form a laminate having a continuous phase of said polymer.
8. A process according to claim 7 wherein the fabric is cellulose paper.
9. A process according to claim 8 wherein the fabric is cotton cloth.
10. A process according to claim 7 wherein said fabric is placed next to two sheets of said water-laid web.

References Cited in the file of this patent

UNITED STATES PATENTS

| | | |
|---|---|---|
| 2,357,962 | Leeman | Sept. 12, 1944 |
| 2,404,714 | Latham | July 23, 1946 |
| 2,558,732 | Cresswell | July 3, 1951 |
| 2,577,763 | Hoxie | Dec. 11, 1951 |
| 2,677,591 | Moody | May 4, 1954 |
| 2,681,265 | Hoxie | June 15, 1954 |
| 2,695,835 | Hare | Nov. 30, 1954 |
| 2,706,674 | Rothrock | Apr. 19, 1955 |